United States Patent
Specht et al.

(10) Patent No.: US 6,857,326 B2
(45) Date of Patent: Feb. 22, 2005

(54) DEVICE FOR MEASURING FORCE ACTING UPON A SEAT BELT

(75) Inventors: Martin Specht, Feldafing (DE); Thomas Heckmayr, Rammingen (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/449,617

(22) Filed: Jun. 2, 2003

(65) Prior Publication Data

US 2004/0040393 A1 Mar. 4, 2004

(30) Foreign Application Priority Data

Sep. 4, 2002 (DE) .......................................... 102 40 896

(51) Int. Cl.[7] .............................................. G01L 1/26
(52) U.S. Cl. ................................................. 73/862.393
(58) Field of Search ..................... 73/862.391, 862.451, 73/82.474, 862.392, 862.393, 862.625, 862.632

(56) References Cited

U.S. PATENT DOCUMENTS

| | | | | |
|---|---|---|---|---|
| 3,692,253 A | * | 9/1972 | Curran | 242/381.4 |
| 4,052,775 A | * | 10/1977 | Gavagan et al. | 24/650 |
| 5,960,523 A | * | 10/1999 | Husby et al. | 24/633 |
| 6,081,759 A | * | 6/2000 | Husby et al. | 701/45 |
| 6,467,849 B1 | * | 10/2002 | Deptolla | 297/464 |
| 6,571,435 B2 | * | 6/2003 | Jain et al. | 24/651 |

FOREIGN PATENT DOCUMENTS

WO    WO 01/79039    10/2001

* cited by examiner

Primary Examiner—Max Noori
(74) Attorney, Agent, or Firm—Lonnie Drayer

(57) ABSTRACT

A device for measuring a belt force acting upon a vehicle seat belt has at least one spring that is connected indirectly to a bearing member of the belt buckle that can be secured to the vehicle structure. A measuring element is connected to the spring, and can be connected to the seat belt and is movably mounted against a bias of the at least one spring proportionally to the belt force, whereby the measuring element is guided by means of a low friction guide means in a predetermined direction.

21 Claims, 3 Drawing Sheets

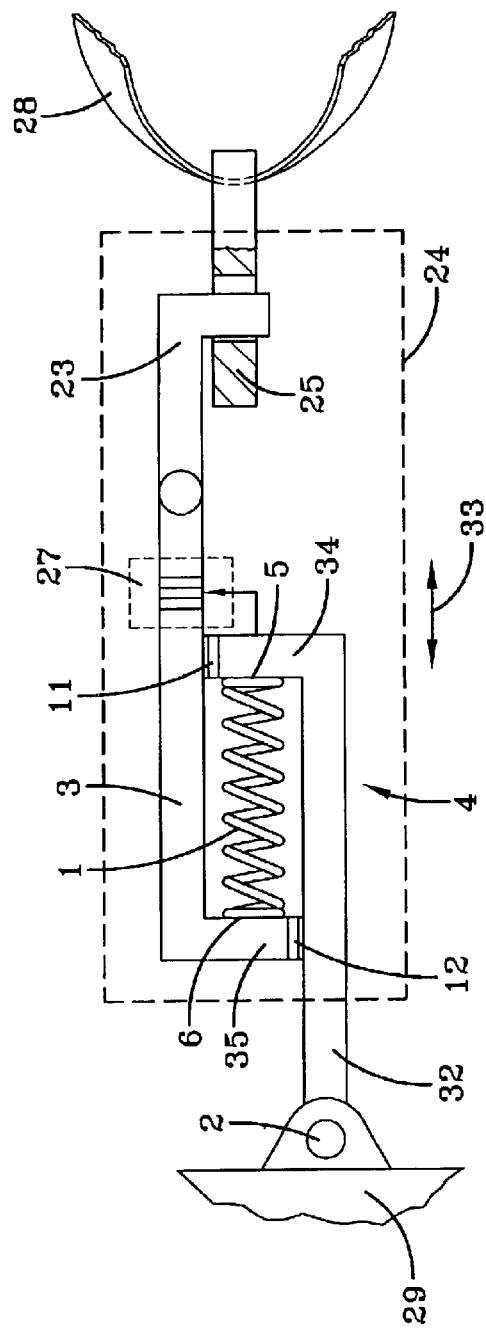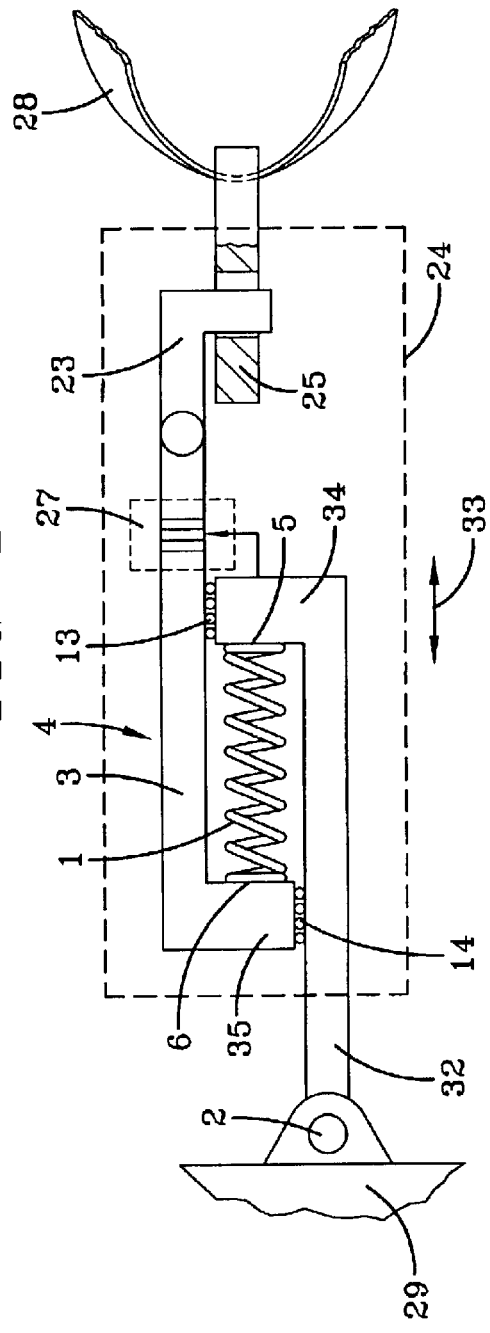

DEVICE FOR MEASURING FORCE ACTING UPON A SEAT BELT

FIELD OF THE INVENTION

The invention relates to a device for measuring the force acting upon a vehicle seat belt.

DISCUSSION OF THE PRIOR ART

WO 01/79039 teaches a device having at least one spring with a spring securing position rigidly connected to a bearing member secured to the vehicle structure. A measuring element that is connected to a second engagement point and which can be connected to the seat belt, is movably mounted against a bias of at least one spring along a distance proportional to the belt force. A sensor supplies a corresponding electrical signal. With a device of this type it is possible to determine whether a vehicle seat is occupied or not. By way of cooperation with a weight measuring device, arranged for instance on the seating surface of the vehicle seat, it can be determined whether the vehicle seat is occupied by a person or a child's safety seat. In addition, the actual weight of a vehicle occupant can be determined by subtracting, from the measured weight, the weight exercised on the vehicle occupant by the applied vehicle seat belt.

SUMMARY OF THE INVENTION

There is provided in accordance with the invention a device for measuring a belt force acting upon a vehicle seat belt comprising at least one spring which comprises a first engagement point on a connecting member that extends to a bearing member of the belt buckle that can be secured to a vehicle structure, a measuring element connected to a second spring securing position, which can be connected to the seat belt and is movably mounted against a bias of the at least one spring proportionally to the belt force, and a sensor which supplies an electrical signal proportional to the belt force, wherein the measuring element is guided by means of a low friction guide means with respect to the bearing member of the belt buckle that can be secured to the vehicle structure in a measuring direction.

BRIEF DESCRIPTION OF THE DRAWINGS

FIG. 1 shows a first embodiment of a device for measuring a belt force acting upon a vehicle seat belt.

FIG. 2 shows a second embodiment.

DETAILED DESCRIPTION OF THE INVENTION

Figure 3:
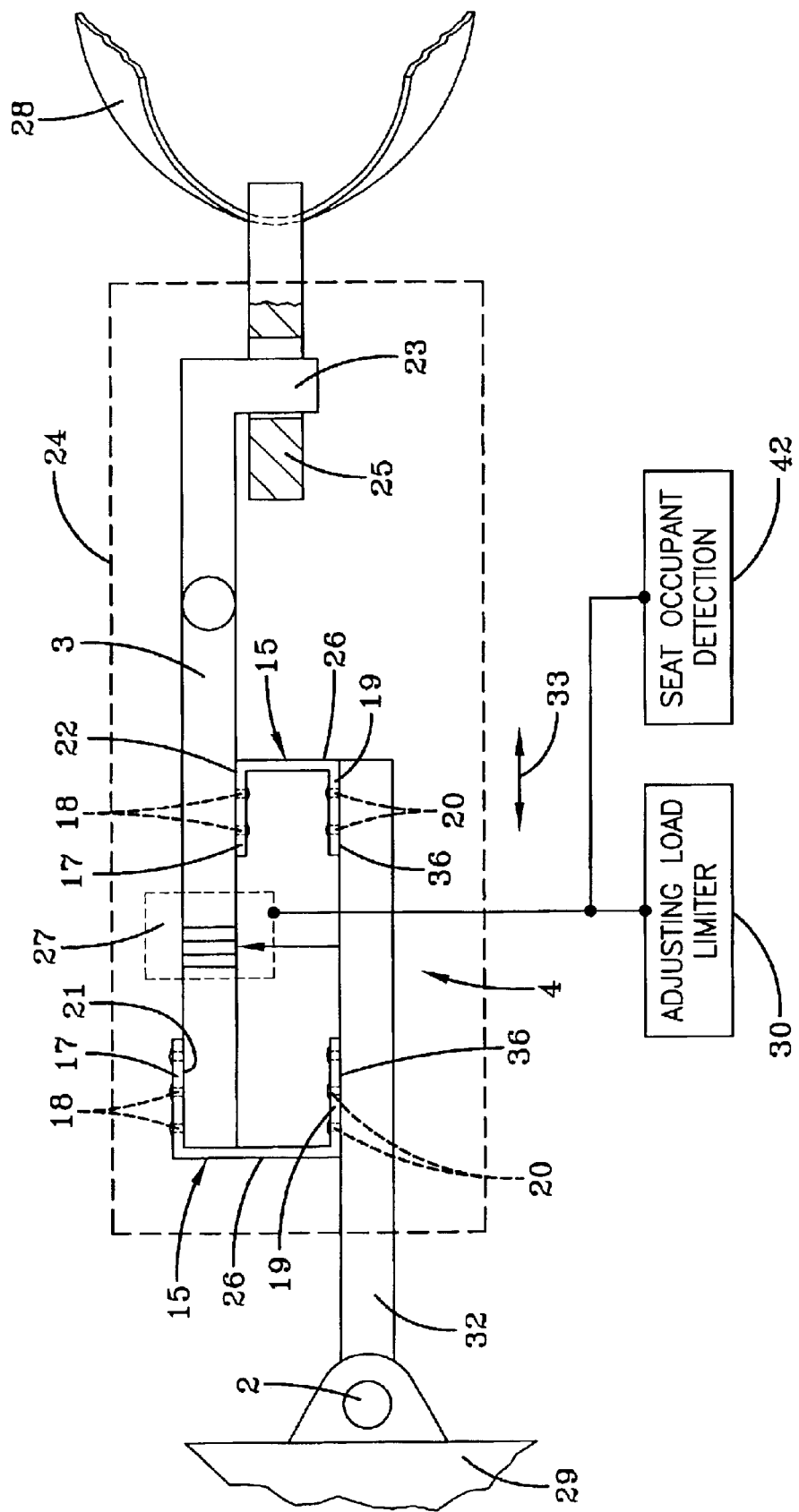
FIG. 3 shows a third embodiment.

The drawings show embodiments of devices for measuring a belt force acting upon a vehicle seat belt 28. The embodiments of FIGS. 1 and 2 each comprise a spring 1 that is clamped between two spring securing positions 5, 6. One spring securing position 5 is connected via a connecting member 32 with a bearing member 2 that is secured to the vehicle structure 29. The connecting member 32 can be a support 4 for a belt buckle 24. The connecting member 32 can be a wire cable, a rigid or spring mounted sheet metal part, a rigid bearing member or in any other suitable component that can allow pivoting of the connecting member 32. A bearing member 2 of the belt buckle secured is to the vehicle structure 29 in the proximity of a vehicle seat.

The other spring securing position 6 of the spring 1 is provided on a measuring element 3. The measuring element 3 can be connected to a seat belt 28. In the represented embodiment the connection takes place by means of a belt buckle 24, in which a buckle tongue 25 connected to the seat belt 28 can be inserted and locked with a movable locking member 23. The measuring element 3 is preferably connected to a belt buckle part, for instance a frame part, to which the locking member 23 engaging the buckle tongue 25 is mounted.

The measuring element 3 is movably mounted with respect to the bearing member 2 secured to the vehicle structure. The movable bearings 11, 12; 13, 14 are oriented in this embodiment in a predetermined direction that corresponds to the direction in which the force emanating from the seat belt 28 is guided or even deflected with respect to the vehicle-secured bearing 2. In the drawings the direction of movement is indicated by a double arrow 33.

In the embodiments shown in FIGS. 1 and 2, preferably one single spring 1 that is a compression spring is foreseen. By reversing the engagement points 5, 6 a tension spring can also be used instead of the compression spring. Preferably, a compression spring as shown in FIGS. 1 and 2 is used. Several adjacent springs 1 can also be foreseen between the spring securing positions 5, 6. In the embodiments of FIGS. 1 and 2, the spring securing positions 5, 6 comprise transverse stop surfaces, which extend perpendicular to the force direction of the belt force and on which the spring 1 is supported. If necessary the connecting member 32 and the measuring element 3 can be bent at right angles, so that the remaining part of the connecting member 32 which is guided to the bearing member 2, as well as the part of the connecting member which is guided in the direction of the seat belt 28, in particular to the insertion point of the buckle tongue 25, are in alignment with the spring force of the spring 1 or are parallel to the spring force if several springs 1 are used.

As can be seen in FIGS. 1 and 2, the guide means 4 is formed, which creates a parallel guiding between the measuring element 3 and the connecting member 32 for the introduction of the deformation process of the at least one spring 1. The construction elements on which the spring securing positions 5, 6 are foreseen, can be spacer bars 34, 35. Between the spacer bars 34, 35 the at least one spring 1 is arranged. For the low-friction movement of the measuring element 3 slide bearings 11, 12, as shown in FIG. 1, or roller bearings 13, 14, as shown in FIG. 2, can be located between the measuring element 3 and the connecting member 32 or the bearing member 2 of the belt buckle secured to the vehicle structure. The guide means 4 is preferably designed in such a manner that a straight deformation line of the at least one spring is predetermined. The straight deformation line is preferably achieved by designing the guide means as parallel guide means. To this effect the two spring securing positions can be connected in the guide means with parallel guide elements in a rigid manner. For the springs it is preferred that metal springs be used.

The measuring element 3 and the connecting member 32 can also be two frame parts which run parallel to one another, and which are configured into a frame by the spacer bars 34, 35 comprising the spring securing positions 5, 6. The slide bearings 11, 12 and the roller bearings 13, 14 in that case are also located between the measuring element and the connecting member.

Figure 4:
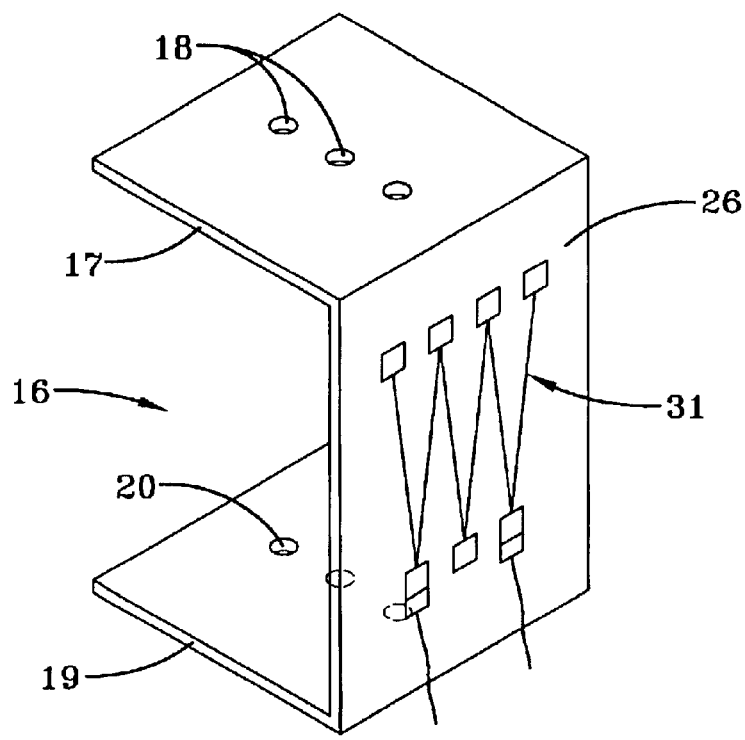
FIG. 4 shows the design of a spring, which is used in the embodiment of FIG. 3.

In the embodiment shown in FIG. 3, parallel structure-supporting springs 15 are disposed between the connecting member 32 and the measuring element 3. The parallel structure-supporting springs 15 are arranged spaced apart in the direction of the belt force, as indicated by a double arrow 33, at a distance from one another. Suitable parallel structure-supporting springs 15 are, for instance, bar spring pairs, which are arranged in the direction of the belt force at a distance from one another. Preferably, leaf springs 16 are used. Rectangular springs 26, as shown in FIG. 4, are preferably suitably used as leaf springs. Triangular or trapezoid springs can also, however, be used as leaf springs. The parallel structure-supporting springs 15 ensure the parallel guiding in the guide means 4 during the deformation of the springs as well as the spring force, in particular the bias against which the measuring element 3 is moved by the belt force originating from the seat belt 28. Preferably, U-shaped leaf springs 16, of which an embodiment is shown in FIG. 4, are used. The leaf spring comprises at free limbs 17, 19 fastening points 18, 20 which, as shown in FIG. 3, are securely connected to the measuring element 3 and the connecting member 32. To each free limb 17, 19 several fastening points 18, 20 can also be foreseen. Due to the free limbs 17, 19 support surfaces are created, against which corresponding support surfaces 21, 22 of the measuring element 3 and support surfaces 36 of the connecting member 32 can lie. To ensure an improved parallel guiding of the measuring element 3, the fastening point 18 of the one leaf spring 16 is located on the one side surface of the measuring element 3 and the fastening point 18 of the other leaf spring 16 is located on the other, opposite side surface of the measuring element 3. In a similar manner, the support surfaces 21, 22 lie on opposite lying side surfaces of the measuring element 3. In the embodiment of FIG. 3 also, the connecting member 32 and the measuring element 3 can comprise bends, such that the piece of the connecting member 32 connected with the bearing member 2 secured to the vehicle structure and the piece of the measuring element 3 guided towards the seat belt 28, in particular towards the insertion region of the buckle tongue 25, are essentially in alignment. This is also achieved in the measuring arrangement shown in FIG. 5.

The parallel structure-supporting springs 15 ensure on the one hand the parallel guiding, in particular parallel to the force direction, in which the belt force is guided to the bearing member 2 secured to the vehicle structure 19, as well as on the other hand the formation of the bias, against which the movement of the measuring element, proportional to the belt force, takes place. The parallel structure-supporting springs can be arranged in pairs or else in large numbers, distanced from each other and in the direction of the belt force.

In the present invention the movement of the measuring element 3 brought about by the belt force is registered by a sensor 27. The sensor 27 can comprise an optical means, with which the movement of the measuring element 3 is registered in comparison with the connecting member 32 and thus in comparison with the vehicle-secured bearing 2. In addition, the movement of the measuring element 3 can be sensed in a capacitive, inductive or other manner, in particular by means of direct detection of the deformation of the at least one spring 1 or the parallel structure-supporting springs 15. For the detection of the spring deformation, wire strain gauges can be used. In the embodiment shown in FIG. 4 of a rectangular spring 26, a wire strain gauge 31 is secured to the rectangular spring 26, which extends between the two free limbs 17, 19. Wire strain gauges 31 are preferably foreseen on the two leaf springs 16 of the embodiment of FIG. 3. The wire strain gauges 31 form the elements of a measuring bridge, the output signal of which is proportional to the spring deformation and thus the deflection of the measuring element 3. The sensor supplies an electrical signal proportional to the belt force by means of path or force measurement. The path-measuring sensor supplies a signal proportional to the deformation of the at least one spring. The deformation is carried out by the measuring element moved against the bias of the at least one spring in dependence of the belt force. The sensor can also be designed in such a manner that it registers the deformation directly on the at least one spring.

Figure 5:
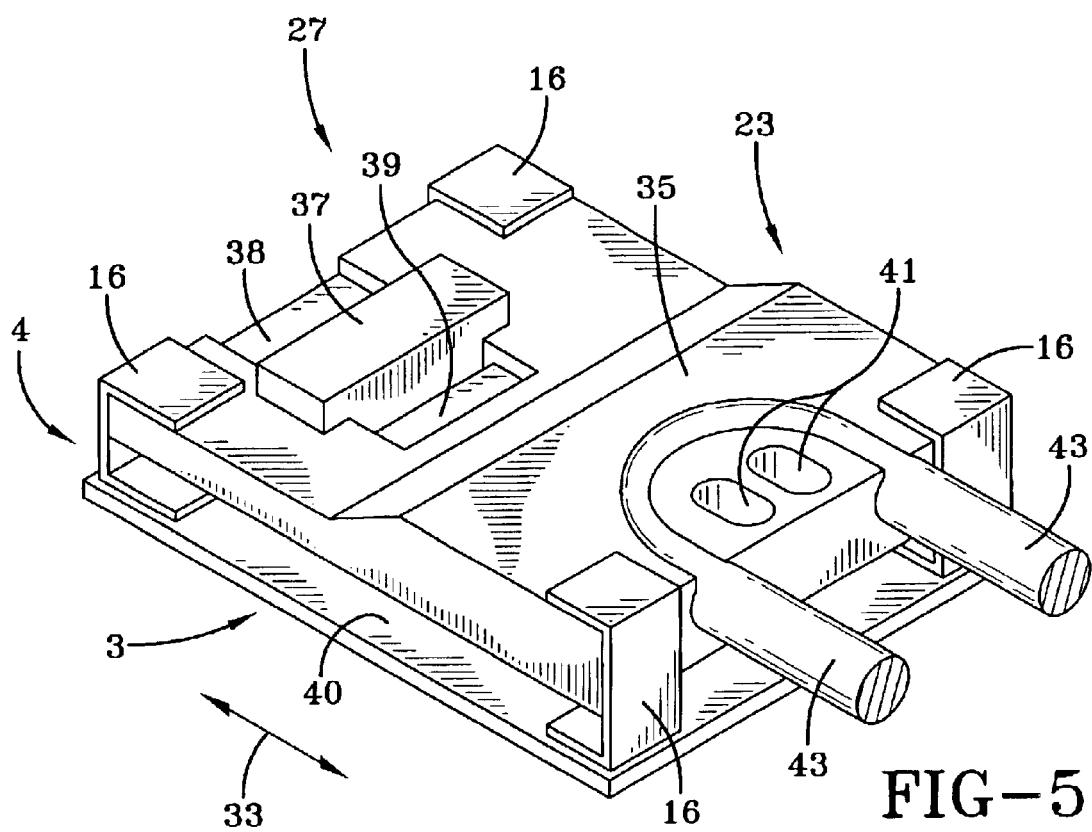
FIG. 5 shows the perspective view of a measuring arrangement.

In the embodiment of a measuring arrangement shown in FIG. 5, a cable shoe 35 to which a wire cable 43 is secured in a cable loop is the connecting member 32. The cable shoe 35 is located in the buckle head of the belt buckle. The connection in the bearing member of the belt buckle secured to the vehicle structure takes place in a known manner with a wire cable 43. By means of the leaf springs 16, which act as parallel structure-supporting springs, a plate 40 of the belt buckle frame is movably arranged as a measuring element 3 opposite the cable shoe 35, as indicated by a double arrow 33. A Hall sensor 37 is secured to the cable shoe 35. The Hall sensor 37 extends into a magnetic field, which is created by two permanent magnets 38, 39. The permanent magnets 38, 39 are securely connected to the frame of the belt buckle, for instance by a plate 40. The plate 40 is securely connected to the seat belt 28 via the locking member 23 with an inserted plug-in tongue. In the case of a belt force, the plate 40 is thus moved with reference to the cable shoe 35 that is stationary on the vehicle structure. On the basis of the relative movement of the Hall sensor 37 in the magnetic field of the permanent magnets 38, 39, the Hall sensor produces in a known manner an electrical signal which is proportional to this movement and thus to the belt force. The Hall sensor forms a path-proportional electrical signal. This signal is proportional to the belt force. At the same time the Hall sensor can be directly connected to the movable measuring element, or else the magnetic field, or two magnets creating the magnetic field, can be moved in relation to the stationary Hall sensor. The magnetic field can also be created by one permanent magnet.

In the cable shoe 35, oblong holes 41 are provided by means of which a not further represented additional plate may be secured for covering the measuring arrangement. Due to the oblong holes, the parallel movement of the plate 40 with respect to the cable shoe 35 is enabled. It is also possible that the Hall sensor is secured to the plate 40 and the permanent magnets 38, 39 are secured to the cable shoe 35, to record the relative movement between the cable shoe and the plate. The measuring arrangement of FIG. 5 forms an embodiment of the sensor 27 shown in the drawings. As is described with reference to FIG. 5, the sensor 27 is preferably located in the region of the parallel guiding 4 in order to achieve a compact structure.

In the embodiments of FIGS. 1, 2 and 3, the sensor 27 is diagrammatically shown for the various embodiments. The electrical output signal of the sensor 27 can be evaluated for setting a belt force limiter. To this effect a corresponding evaluating device 30 is in circuit communication with the sensor 27. The evaluating device 30 can be in circuit communication with corresponding adjustment means, for instance an electric motor and/or a switch device for controlling mechanical belt force limiters on different levels. In this way force limiters foreseen in seat belt retractors, for instance in the form of torque rods, friction couplings or an electric motor adjusting the force limitation action, can be correspondingly controlled. In this manner, depending on the belt force acting upon the seat belt 28, the belt force limiter curve can be adjusted.

In addition, the output signal of the sensor 27 can be in circuit communication with a seat occupancy detection device 42. By means of the latter, in connection with a force measuring means which measures the weight force acting upon a vehicle seat, it can be determined whether the vehicle seat is occupied by a child's safety seat or a person. Furthermore, by subtracting the measured belt force, the weight force measuring can be corrected to its accurate value.

The shown measuring arrangement, comprising the sensor 27 and the guide means 4, is foreseen between the buckle tongue 25 inserted in the belt buckle 24 and the bearing member 2 of the belt buckle secured to the vehicle structure. In this case the sensor 27 and the guide means 4 can be arranged outside the housing of the belt buckle 24. Preferably, the sensor 27 and the guide means 4 are arranged within the housing of the belt buckle 24, as is shown in FIG. 5. In this case the measuring element 3 can be formed by one or two buckle plates belonging to the buckle frame. The locking member 23, which during the locking of the belt buckle engages the belt tongue 25, is movably arranged on the frame. In the embodiments, the belt buckle frame, on which the locking member 23 is arranged, can be movably arranged, guided by the guide means 4 with respect to the bearing member 2 of the belt buckle secured to the vehicle structure 29.

While the present invention has been described in conjunction with specific embodiments thereof, many alternatives, modifications, and variations will be apparent to those skilled in the art in view of the foregoing description. Accordingly, the invention is intended to embrace all such alternatives, modifications, and variations that fall within the spirit and scope of any appended claims.

We claim:

1. A device for measuring a belt force acting upon a vehicle seat belt comprising at least one spring which comprises a first engagement point on a connecting member that extends to a bearing member of the belt buckle that can be secured to a vehicle structure, a measuring element connected to a second spring securing position, which can be connected to the seat belt and is movably mounted against a bias of the at least one spring proportionally to the belt force, and a sensor which supplies an electrical signal proportional to the belt force, wherein the measuring element is guided by means of a low friction guide means with respect to the bearing member of the belt buckle that can be secured to the vehicle structure in a measuring direction, the guide means comprising guide elements disposed between the measuring element and the connecting member comprise slide bearings or roller bearings.

2. The device for measuring a belt force acting upon a vehicle seat belt according to claim 1, wherein due to the guide means an essentially straight line deformation of the at least one spring is predetermined.

3. The device for measuring a belt force acting upon a vehicle seat belt according to claim 2, wherein the straight line deformation is achieved by a parallel guiding provided by the guide means.

4. The device for measuring a belt force acting upon a vehicle seat belt according to claim 1, wherein the two spring securing positions are components of the guide means.

5. The device for measuring a belt force acting upon a vehicle seat belt according to claim 1, wherein the at least one spring is a compression or tension spring.

6. The device for measuring a belt force acting upon a vehicle seat belt according to claim 1, wherein the at least one spring is a metal spring.

7. The device for measuring a belt force acting upon a vehicle seat belt according to claim 1, wherein the measuring element is rigidly connected to a belt buckle part or is formed by a belt buckle part, on which a locking member is mounted for engaging a buckle tongue connected to the seat belt.

8. The device for measuring a belt force acting upon a vehicle seat belt according to claim 1, wherein the sensor is connected to the measuring element.

9. The device for measuring a belt force acting upon a vehicle seat belt according to claim 1, wherein the sensor detects the deformation of the at least one spring and supplies an electrical signal proportional to degree of deformation.

10. The device for measuring a belt force acting upon a vehicle seat belt according to claim 1, wherein the sensor is a wire strain gauge.

11. The device for measuring a belt force acting upon a vehicle seat belt according to claim 1, wherein the sensor is a Hall sensor.

12. The device for measuring a belt force acting upon a vehicle seat belt according to claim 1, wherein the measuring arrangement comprises the at least one spring, the guide means, the spring securing positions and the sensor is arranged in a housing of the belt buckle.

13. The device for measuring a belt force acting upon a vehicle seat belt according to claim 11, wherein the belt buckle frame can be moved along a measuring distance, guided by the guide means with reference to the bearing member of the belt buckle that can be secured to the vehicle structure and in dependence of the belt force.

14. The device for measuring a belt force acting upon a vehicle seat belt according to claim 1, wherein the sensor is in circuit communication with an evaluating device for the adjustment of a belt force limiter characteristic curve.

15. The device for measuring a belt force acting upon a vehicle seat belt according to claim 1, wherein the sensor is in circuit communication with a seat occupancy detection device.

16. A device for measuring a belt force acting upon a vehicle seat belt comprising at least one spring which comprises a first engagement point on a connecting member that extends to a bearing member of the belt buckle that can be secured to a vehicle structure, a measuring element connected to a second spring securing position, which can be connected to the seat belt and is movably mounted against a bias of the at least one spring proportionally to the belt force, and a sensor which supplies an electrical signal proportional to the belt force, wherein the measuring element is guided by means of a low friction guide means with respect to the bearing member of the belt buckle that can be secured to the vehicle structure in a measuring direction, and further comprising at least two parallel structure-supporting spring, which are spaced at distance from each other in the direction of the belt force, wherein the parallel structure-supporting springs are leaf springs.

17. The device for measuring a belt force acting upon a vehicle seat belt according to claim 16, wherein the leaf springs are U-shaped.

18. The device for measuring a belt force acting upon a vehicle seat belt according to claim 17, wherein each U-shaped leaf spring has a first free limb comprising fastening points for fastening to the measuring element and each U-shaped leaf spring has a second free limb comprising fastening points for fastening to the connecting member.

19. The device for measuring a belt force acting upon a vehicle seat belt according to claim 18, wherein the fastening points of the first free limbs are connected to the measuring element on opposite sides of the measuring element.

20. The device for measuring a belt force acting upon a vehicle seat belt according to claim 18, wherein the measuring element lies against the first free limbs with support surfaces.

21. A device for measuring a belt force acting upon a vehicle seat belt comprising at least one spring which comprises a first engagement point on a connecting member that extends to a bearing member of the belt buckle that can be secured to a vehicle structure, a measuring element connected to a second spring securing position, which can be connected to the seat belt and is movably mounted against a bias of the at least one spring proportionally to the belt force, and a sensor which supplies an electrical signal proportional to the belt force, wherein the measuring element is guided by means of a low friction guide means with respect to the bearing member of the belt buckle that can be secured to the vehicle structure in a measuring direction, wherein the sensor is connected directly to the at least one spring.

* * * * *